United States Patent
Sharma et al.

(10) Patent No.: US 12,158,819 B2
(45) Date of Patent: Dec. 3, 2024

(54) HIGH AVAILABILITY FOR BACKUP AND RESTORE APPLICATIONS IN PUBLIC CLOUDS

(71) Applicant: DELL Products L.P., Round Rock, TX (US)

(72) Inventors: Shefali Sharma, San Jose, CA (US); Fei Wang, Sunnyvale, CA (US); Durga Prasad Thorati, Gilroy, CA (US); Rajiv Shanmugam Madeswaran, Milpitas, CA (US)

(73) Assignee: Dell Products L.P., Round Rock, TX (US)

(*) Notice: Subject to any disclaimer, the term of this patent is extended or adjusted under 35 U.S.C. 154(b) by 16 days.

(21) Appl. No.: 18/166,637

(22) Filed: Feb. 9, 2023

(65) Prior Publication Data

US 2024/0272989 A1    Aug. 15, 2024

(51) Int. Cl.
*G06F 11/14* (2006.01)
*G06F 11/20* (2006.01)

(52) U.S. Cl.
CPC ...... *G06F 11/1464* (2013.01); *G06F 11/1484* (2013.01); *G06F 11/2023* (2013.01)

(58) Field of Classification Search
CPC ............ G06F 11/1464; G06F 11/1484; G06F 11/2023
See application file for complete search history.

(56) References Cited

U.S. PATENT DOCUMENTS

| | | | | |
|---|---|---|---|---|
| 8,499,297 B2 * | 7/2013 | Chen | ........... | G06F 11/1484 718/1 |
| 9,588,716 B1 * | 3/2017 | Yadav | ........... | G06F 11/1456 |
| 11,855,905 B2 * | 12/2023 | Busick | ........... | H04L 45/34 |

* cited by examiner

*Primary Examiner* — Nadeem Iqbal
(74) *Attorney, Agent, or Firm* — Dergosits & Noah LLP; Todd A. Noah

(57) ABSTRACT

Providing high availability for backup and restore applications in public clouds is described. A system creates a first virtual machine and a second virtual machine for at least one zone of a public cloud. The system creates a disk in the public cloud, and enables a selection to attach the disk as a shared disk to the first virtual machine and/or the second virtual machine; The system creates object storage that stores backup data for the first virtual machine and/or the second virtual machine. The system deploys the first virtual machine as an active node that executes a backup and restore application and the second virtual machine as a passive node that executes the backup and restore application when the active node fails to execute the backup and restore application.

20 Claims, 10 Drawing Sheets

300

| Attributes | Amazon Web Services | AZURE | Google Cloud Platform | |
|---|---|---|---|---|
| Small Computer Systems Interface Persistent Reservation support | No - | Yes | Yes (Zonal Persistent Disk) | No (Regional Persistent Disk) |
| High Availability option | Within Availability Zone 302 | Zone Redundant 306 | Within Availability Zone (Zonal Persistent Disk) 304 | Zone Redundant (Regional Persistent Disk) 308 |
| Maximum disk size | 16 TB | 32 TB | 64TB | 64TB |
| Maximum Inputs/Outputs Per Second | 64,000 | 20000 | 100,000 | 60000 (Read)/ 30,000 (Write) |
| Maximum Throughput | 1000 MB/s | 900 MB/s | 1200 MB/s | 1200 MB/s (Read)/6 00 MB/s (Write) |
| Maximum number of attachments | 16 | 10 | 2 | 1 |
| Disk Resize | Yes | Yes | No | Yes |

FIG. 3

HIGH AVAILABILITY FOR BACKUP AND RESTORE APPLICATIONS IN PUBLIC CLOUDS

BACKGROUND

A data object may be a set of information that is backed up as a unit. If a software error corrupts a data object, or if erroneous data updates the data object, a data protection administrator may restore the data object to a previous state that does not include the corrupted or erroneous data. A backup/restore application performs a backup operation either occasionally or continuously to enable this restoration, storing a copy of each desired data object state (such as the values of the data object and the embedding of these values in a database's data structures) within dedicated backup files. When the data protection administrator decides to reinstate the data object to a previous state, the data protection administrator specifies the desired previous state by identifying a desired time when the data object was in this previous state, and then instructs the backup/restore application to perform a restore operation to restore a copy of the corresponding backup file(s) for that previous state to the data object.

A backup/restore application may be provided via cloud computing, which can be a type of Internet-based processing that remotely provides shared processing resources and data to processors and other devices on demand. Cloud computing can be used as a model for enabling ubiquitous, on-demand access to a shared pool of configurable processing resources (such as networks, servers, storage, applications, and services), that may be rapidly provisioned and released with minimal management effort. Cloud computing and storage solutions can provide individual users and enterprises with various capabilities to store and process their data in third-party data centers that may be located far from a user, ranging in distance from across a city to across the world. Cloud computing can rely on sharing of resources to achieve coherence and economy of scale. An enterprise can use cloud computing to scale up as processing needs increase and then scale down again as processing demands decrease.

An end user can use a client device to request the creation of a virtual machine environment, which may be created in a cloud computing environment or any other processing environment that enables the creation of a requested virtual machine environment. A virtual machine environment may be the overall structure within which an emulated computer operates. Examples of virtual machine environments include a single virtual machine and include multiple virtual machines that function as a load balancer, two or more application servers, which may execute backup/restore applications, a database server, and a storage server.

A data object and/or a backup file may be stored on a cloud storage system, which can be a model of data storage in which digital data is stored in logical pools, with the physical storage spanning multiple servers, and often locations, and the physical environment typically owned and managed by a hosting company. A cloud storage provider is responsible for keeping the stored data available and accessible, and the physical environment protected and running. People and organizations buy or lease storage capacity from a cloud storage provider to store user, organization, and/or application data. Cloud storage services may be accessed through a co-located cloud computing service, a web service application programming interface (API), or by applications that utilize a web service API, such as cloud desktop storage, a cloud storage gateway, or Web-based content management systems.

Data storage systems include recording media that retain digital information, have evolved towards scalable designs that can grow with customer demand by adding storage and computation as necessary, and typically store redundant information. For example, when creating a copy of an enterprise's email system data which includes 100 instances of the same 1 Megabyte (MB) data backup file attachment, a data storage system could store all 100 instances of the same 1 MB data backup file attachment, inefficiently using 100 MB of storage space to store the same 1 MB data backup file attachment. Data deduplication can eliminate redundant copies of information, which can improve the utilization of data storage systems and lower capital expenditure by reducing the total amount of recording media required to meet the capacity needs of data storage systems. Continuing the previous example, a data deduplication system stores only one instance of the same 1 MB data backup file attachment and stores small references to the one stored instance for the 99 subsequent instances.

Enterprises of different sizes in various industries, such as finance, telecommunications, and healthcare, are moving their computing and storage resources to the cloud. Such realzones of resources can reduce up-front capital expenditure investments and maintenance costs. Since their primary workloads have been moved to the cloud these enterprises now need data protection in the cloud.

Data backup/restore systems, such as Dell's Data Domain Virtual Edition, offer cost-optimized data protection solutions that backup/restore data in a public cloud. Data Domain Virtual Edition is a software-only deduplication appliance that provides data protection for entry and enterprise environments. The Data Domain Virtual Edition instance can run on a customer's premises and/or in a public cloud such as Amazon Web Services, Azure, and Google Cloud Platform. A failure in a software stack or in a public cloud can terminate a backup/restore application, thereby impacting customers' data protection. Since the temporary loss of data protection can indirectly affect customers' sales, such customers are concerned about the availability of backup/restore applications in public clouds.

BRIEF DESCRIPTION OF THE DRAWINGS

FIG. 3 illustrates a block diagram of an example table which depicts a summary of shared disk specifications for multiple cloud providers, which provide high availability of a backup/restore application under an embodiment;

DETAILED DESCRIPTION

Figure 1:
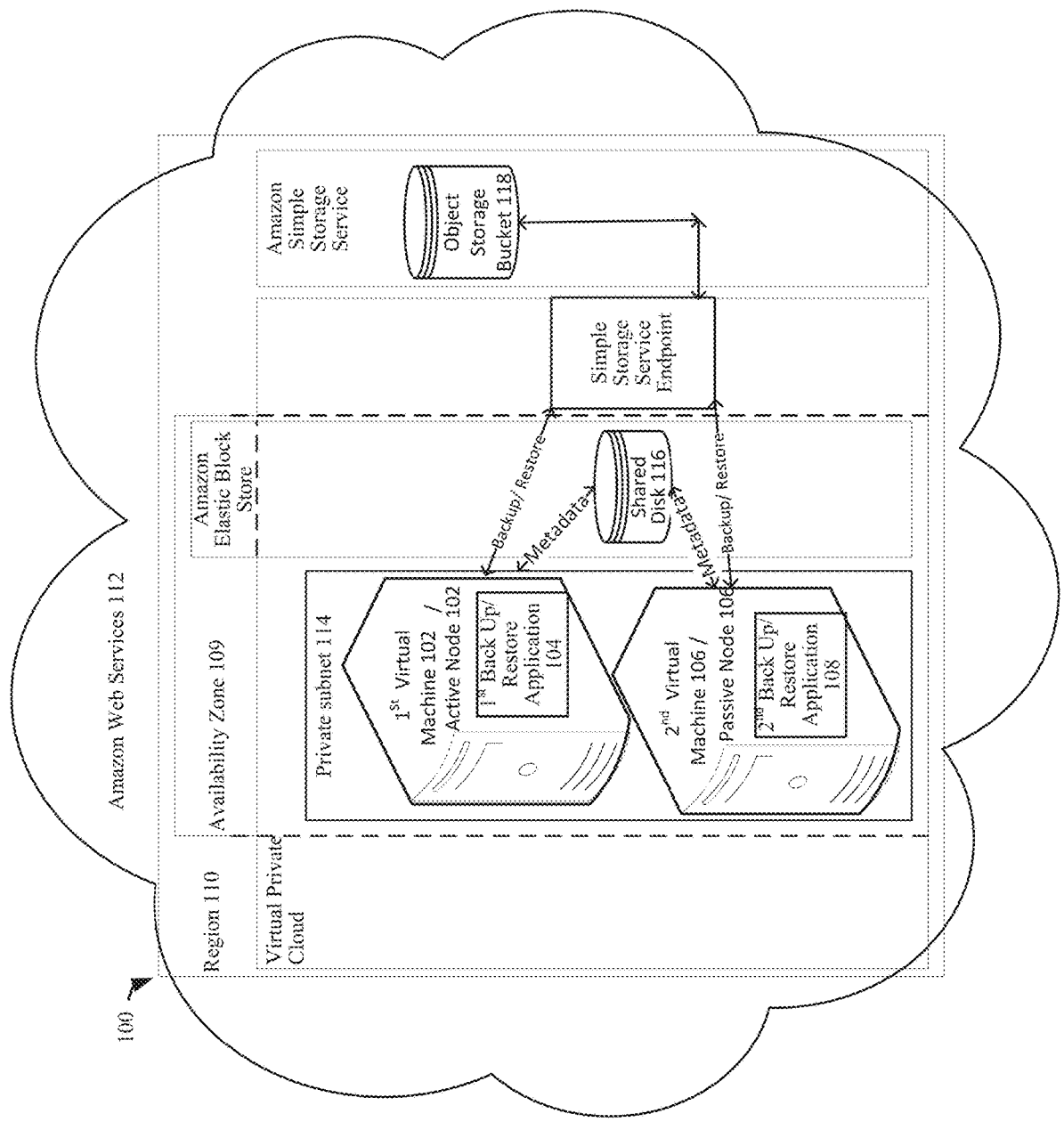
FIG. 1 illustrates a block diagram of an example system that includes active and passive nodes that provide high availability of a backup/restore application in Amazon Web Services, under an embodiment.

High-availability clusters, also known as failover clusters, are groups of computers that support server applications that may be reliably utilized with a minimum amount of down time. High availability clusters operate by using high availability software to harness redundant computers, which may be referred to as nodes, in groups or clusters that provide continued service when system components fail. Without clustering, if a server running a particular application stops functioning, the application will be unavailable until the server is restarted.

High availability clustering remedies this situation by detecting hardware/software faults, and immediately restarting the application on another system without requiring administrative intervention, which is a process known as failover. As part of this process, clustering software may configure a node before starting an application on the node. For example, appropriate filesystems may need to be imported and mounted, network hardware may have to be configured, and some supporting applications may need to be running as well.

Dell's Data Domain systems provide a high availability feature which enables customers to configure two Data Domain systems as an active node and a passive node pair, which provides redundancy in the event of a system failure. High availability features keep two Data Domain systems coordinated, such that during a hardware or a software failure on the active node, the passive node can take over and start where the active node left off. Therefore, ensuring the high availability of a Data Domain system in a public cloud can minimize a data protection service's backup and archiving downtime.

Cloud native applications typically use micro-service-based architecture, which know how to run and adapt themselves accordingly in multi-instances on demand. With the help of orchestration software, like Kubernetes, cloud native applications can easily achieve high availability. However, it is extremely difficult for traditional applications to adopt this architecture because usually such an adaptation requires an application to be re-architected.

This disclosure describes a high availability system for mission critical traditional applications, such as Data Domain Virtual Edition, executing in a public cloud. This high availability system does not need architecture level changes or any other significant changes to support high availability for applications such as Data Domain Virtual Edition. Instead, by leveraging cloud technologies, such as shared disks, networking, and object storage bucket consistency features, to work in tandem with existing high availability features, such as Dell's Data Domain Restorer's high availability features, to adopt the public cloud and provide a complete high availability system in the public cloud for traditional applications, such as Data Domain Virtual Edition. A Data Domain Restorer is an inline deduplication appliance that provides data protection and disaster recovery in the enterprise environment.

Embodiments herein provide high availability for backup/restore applications in public clouds. A system creates a first virtual machine and a second virtual machine for at least one zone of a public cloud. The system creates a disk in the public cloud, and enables a selection to attach the disk as a shared disk to the first virtual machine and/or the second virtual machine. The system creates object storage that stores backup data for the first virtual machine or the second virtual machine. The system deploys the first virtual machine as an active node that executes a backup/restore application and the second virtual machine as a passive node that executes the backup/restore application when the active node fails to execute the backup/restore application.

For example, a system creates a first virtual machine and a second virtual machine in an availability zone in the US West (Oregon) region in Amazon Web Services. The system creates a IO2 solid-state disk in the same availability zone and sets the disk type and the disk size to provide the required inputs/outputs per second. The system enables an administrator to select an "enable multi-attach" option which attaches the IO2 solid-state disk to the two virtual machines, thereby becoming a shared disk. The system creates an object storage bucket for storing backup data for the two virtual machines. The system deploys the first virtual machine as an active node that executes a backup/restore application and the second virtual machine as a passive node that executes the backup/restore application when the active node fails to execute the backup/restore application.

In another example, a system instructs an Azure public cloud to provide two Azure virtual machines across three Azure availability zones in the West US 2 (Washington) region in the Azure public cloud, thereby enabling recovery from an availability zone failure. The system creates a zone-redundant premium solid-state disk, across two Azure availability zones in the West US 2 region in the Azure public cloud, thereby enabling recovery from an availability zone failure. The system provides the option "Enable shared disk" which makes the zone-redundant premium solid-state disk become sharable among the two Azure virtual machines. The system creates a hot blob object storage account, which organizes data based on how frequently the data will be accessed and how long the data will be retained, for backup data from the two Azure virtual machines, in the same West US 2 region where the two Azure virtual machines were created. The system deploys the two Azure virtual machines as an active node, which executes a backup/restore application, and a passive node, which executes the backup/restore application when the active node fails to execute the backup/restore application, in different availability zones within the West US 2 region in the Azure public cloud.

In yet another example, the system configures a Google Cloud Platform to create a first virtual machine and a second virtual machine in the same availability zone in the Los Angeles region of the Google Cloud Platform, or between two availability zones in the same LA region in the Google Cloud Platform. The system configures the Google Cloud Platform to provide a zonal or regional solid-state persistent disk to be shared by the two virtual machines, which become the high availability active node and passive node. Zonal solid-state persistent disks are made sharable by selecting the "multiWriter" property during the disk creation, while regional solid-state persistent disks may be attached to only one virtual machine or node at a time. Therefore, during a failover, the high availability subsystem forces the attachment of the regional solid-state persistent disk from the failed high availability active node to the high availability passive node. After creating object storage for storing backup data for the two virtual machines, the system deploys the two virtual machines as an active node that executes a backup/restore application and a passive node that executes the backup/restore application, when the active node fails to execute the backup/restore application, which may be deployed in the same availability zone in the LA region, or between two zones in the LA region, in the Google Cloud Platform.

This disclosure describes different systems and methods which provide a single highly-available backup/restore application in a public cloud. The high availability system includes two backup/restore application instances executing simultaneously in a public cloud. One backup/restore application functions as an active node in a public cloud while the other backup/restore application functions as a passive node in a public cloud. When an active node encounters any significant problems caused by software or hardware issues in a public cloud, then the passive node will become the active node.

Each backup/restore application instance has its own operating system disk, but these instances have access to the same data storage, including block storage and object storage, in a public cloud. The block storage, which is for metadata disks, and the object storage are shared between active and passive backup/restore application nodes. The storage cost for a high availability pair of nodes would be the same as the storage cost for a single node. The additional expenses for a high availability pair of nodes in a public cloud comes from the compute cost for the passive node.

A high availability configuration requires storage to be shared among the active node and any number of passive nodes. In some embodiments, the storage privileges need to be fenced off between an active node and a passive node during takeover and fail-back. A small computer systems interface (SCSI) persistent reservation for a hard disk drive and a non-volatile memory's reservation register/acquire/release for a solid-state disk may be used underneath to implement storage fencing for a high availability configuration.

Persistent reservation requires an initiator to register itself with a disk before reserving the disk. The registration process can require a key, such as a 64-bit key, which is associated with the initiator port, the target port, and the disk. Registrations may be removed by the owner of the disk, or preempted by another node that knows the key.

Registration removals also clear the reservation held by the corresponding initiators. Among many reservations, high availability systems can use a "write exclusive—registrants only" reservation which enables write access by all the registered initiators. A node that takes over as an active node will always preempt all existing registrations to ensure that two nodes cannot write to the same storage at the same time.

Public clouds provide a shared disk offering in their ecosystem. The Data Domain Virtual Edition can leverage this shared disk offering and use a high availability configuration to coordinate storage fencing between active and passive Data Domain Virtual Editions in the public cloud. Using a shared disk can also cause data inconsistencies for the standard filesystems.

Data Domain Virtual Edition can rely to a great extent on the standard filesystem EXT3. The EXT3 filesystem is not designed to be accessed simultaneously by multiple Data Domain Virtual Edition instances or servers, because simultaneous access can result in data corruption or loss.

During a failover, the passive node which is going to become the active node cannot identify the recent changes in the filesystem immediately. In anticipation of a failure, an active node synchronizes its data to the shared disk. When a failover triggers the passive node, which becomes the active node, the failover should re-mount the filesystem partitions.

In Amazon Web Services, an elastic block store provides a block storage service designed to work with Amazon Elastic Compute Cloud. Elastic block store volumes may be divided into two major categories, solid-state disk-backed storage and Hard Disk Drive-backed storage. There are several volume types in each of these categories, but the shared disk feature is available only on the solid-state disk-backed storage volume types IO1 and IO2.

An elastic block store's volume type IO1 or IO2, which can provision various required inputs/outputs per second via a solid-state disk, may be attached to multiple instances simultaneously by enabling the "multi-attach" option during the volume's creation. A multi-attached volume, which may be referred to as a shared volume, requires nitro based elastic compute cloud instance types within the same availability zone. Elastic compute cloud instances, to which the shared volume is attached, will have full read and write permission to the shared volume. A shared volume may be simultaneously attached to a maximum of 16 nitro-based elastic compute cloud instances.

Availability zones are logically isolated sections of a region. Each region has multiple availability zones that are designed to operate independently. Availability zones are physically separated by a meaningful distance to protect from correlated impact from potential issues, such as lightning strikes, tornadoes, and earthquakes. Availability zones do not share power or other infrastructure, but they are connected to each other with fast networking to enable applications to quickly fail over without interruption.

On the downside, the shared volumes in Amazon Web Services do not support input/output fencing protocols to maintain data consistency. Consequently, the instances using the shared volume must take care of controlling write access to the shared disk by using software-based solutions such as pacemaker or distributed locking. The high availability active and passive nodes can use the IO2 volume type because of the volume's modification support and the volume's global footprint. The required inputs/outputs per second may be provisioned for the shared volume during the disk creation, such that the instances to which the shared disk is attached cannot collectively exceed the provisioned inputs/outputs per second limit.

FIG. 1 depicts a high availability active node and passive node within the same availability zone in Amazon Web Services 100. In some embodiments, a system creates a first virtual machine 102 that becomes an active node 102 which executes a first backup/restore application 104 and a second virtual machine 106 that becomes a passive node 106 which executes a second backup/restore application 108. Then the system deploys the active node 102 and the passive node 106 in the same availability zone 109 in a region 110 in Amazon Web Services 112, and keep the active node 102 and the passive node 106 in a private subnet 114 with private addresses. Then the system creates a volume 116 which becomes a shared disk 116, and sets the volume type and the volume size to provide the required inputs/outputs per second on an IO2 solid-state disk 116, which is in the same availability zone 109 where the active node 102 and the passive node 106 are deployed. The system enables an administrator to select an "enable multi-attach" option for the volume 116, which attaches the solid-state disk 116 to the active node 102 and the passive node 106. Then the system creates an object storage bucket 118 for backup data from the active node 102 and the passive node 106 in the region 110 where the active node 102 and the passive node 106 are deployed.

An Azure public cloud 202 provides Azure virtual machines 204 and 206 which can use four block-level storage disk types, such as ultra-disks, premium solid-state disks, standard solid-state disks, and standard hard disk drives, as if they were physical disks. The high availability active node 204 and passive node 206 can use the premium solid-state disk type as metadata storage in the Azure public cloud 202. The premium solid-state disks offer two types of storage redundancy options, zone-redundant storage, and local-redundant storage. Local-redundant storage replicates data three times within a single data center in the selected region to protect the data against drive and server rack failures.

Zone-redundant storage replicates data via managed premium solid-state disks 208A, 208B, and 208C, which collectively are managed premium solid-state disk 208, across two Azure availability zones 210, 212, and 214 in a region 216, thereby enabling recovery from an availability zone failure. The high availability active node 204 and passive node 206 can share Azure zone-redundant storage premium solid-state disks. Therefore, during the creation of a zone-redundant storage premium solid-state disk 208, the disk option "Enable shared disk" is selected to make the disk 208 sharable among the virtual machines 204 and 206 The number of virtual machines that can attach to a shared disk is based on the tunable parameter maxShares (maximum shares) which is assigned during disk creation.

The current high availability configuration requires the maxShare value to be set to two since the created disk 208 will be shared between the high availability active node 204 and the high availability passive node 206. A shared zone-redundant storage disk 208 may be attached to high availability nodes, the active node 204 and the passive node 206, and may be located on different availability zones 210, 212, and 214 to take advantage of both zone-redundant storage and availability zones for high availability active node 204 and passive node 206. In case of a failure in one availability zone of the primary high availability active node 204, the high availability system can quickly fail over to the secondary high availability passive node 206 in another availability zone.

Figure 2:
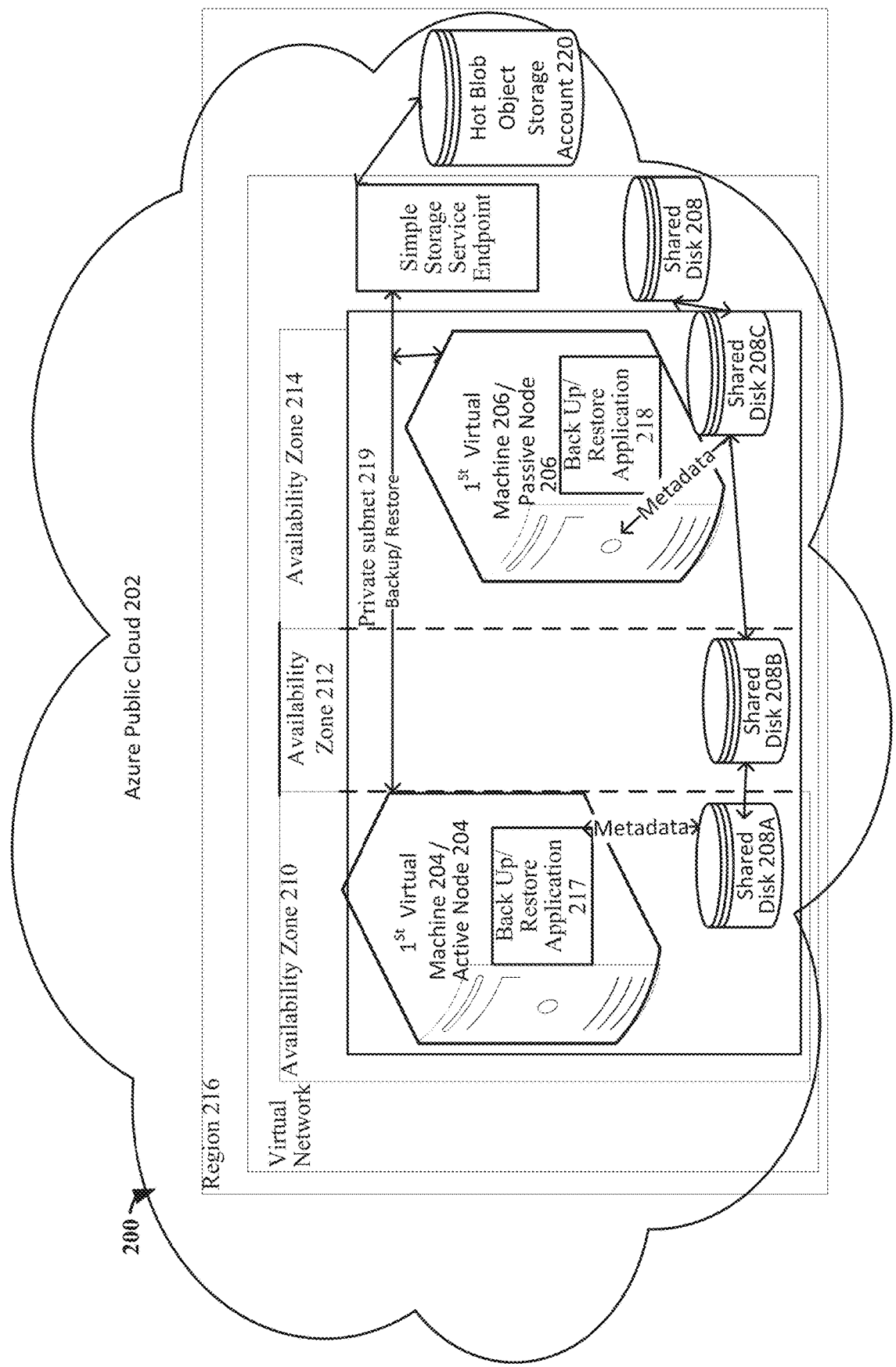
FIG. 2 illustrates a block diagram of an example system that includes active and passive nodes that provide high availability of a backup/restore application in Azure, under an embodiment.

FIG. 2 depicts a high availability pair 200 of an active node 204 and a passive node 206 in two of the different availability zones 210, 212, and 214 in the Azure public cloud 202. An active node 204 that executes a first backup/restore application 217 and a passive node 206 that executes a second backup/restore application 218 are initially created as 2 virtual machines, which are deployed in two of the different availability zones 210, 212, and 214 within the same region 216 in the Azure public cloud 202, and are kept in a private subnet 219 with the private address. Then a managed zone-redundant storage premium's solid-state disk drive 208 is created, with an appropriate size, in the same region 216 where the active node 204 and the passive node 206 are deployed. The "enable shared disk" option is selected for the disk 208 and the "max shares" value is set to two, which results in attaching the disk 208 to the active node 204 and the passive node 206. A hot blob object storage account 220 is created to store backup data from the active node 204 and the passive node 206, in the same region 216 where the active node 204 and the passive node 206 are deployed.

A hot blob object storage account 208 can organize data based on how frequently the data will be accessed and how long the data will be retained. Azure storage offers different access tiers that store blob data in the most cost-effective manner based on how the data is being used. Azure storage access tiers include a hot tier, a cool tier, and an archive tier.

A hot tier is an online tier optimized for storing data that is accessed or modified frequently. The hot tier has the highest storage costs, but the lowest access costs. A cool tier is an online tier optimized for storing data that is infrequently accessed or modified. Data in the cool tier should be stored for a minimum of 30 days. The cool tier has lower storage costs and higher access costs compared to the hot tier.

An archive tier is an offline tier optimized for storing data that is rarely accessed, and that has flexible latency requirements, on the order of hours. Data in the archive tier should be stored for a minimum of 180 days. Azure storage capacity limits are set at the account level, rather than according to access tier. Users can choose to maximize capacity usage in one tier, or to distribute capacity across two or more tiers.

The Google Cloud Platform provides different storage options, such as a persistent disk, which is a durable storage device that may be accessed like a physical disk, which may be used by the high availability active node and passive node. A Google Compute Engine manages a persistent disk's physical disk and data distribution to ensure performance and redundancy. When configuring a persistent disk, there are four persistent disk type options available: standard persistent disks, balanced persistent disks, solid-state disk persistent disks, and extreme persistent disks.

Persistent disks are divided into two categories, zonal persistent disks and regional persistent disks. Zonal persistent disks are managed within the same availability zone whereas regional persistent disks replicate data between two different availability zones in the same region. The Google Cloud Platform supports sharing of persistent disks only within the same availability zone.

The Data Domain Virtual Edition high availability nodes can use both zonal and regional solid-state disk persistent disks to share data between the high availability active node and passive node. Zonal solid-state persistent disks are made sharable by enabling the "multiWriter" property during the disk creation. Multi-writer disks are currently in preview, and they are sharable by at most two N2 virtual machines.

Persistent disks in the multi-writer mode support a subset of Small Computer Systems Interface-3 Persistent Reservation commands. Data Domain Virtual Edition high availability nodes can leverage such commands for Input/Output fencing and for failover configurations. Regional persistent disks may be attached to only one instance at a time.

For high availability, only the active node has control over the regional persistent disk. Furthermore, an active high availability node will have full read/write control over the shared disk. During a failover, the high availability subsystem should force attach the regional persistent disk from the failed high availability active node to the high availability passive node. The system does not use a regional persistent disk for any input/output fencing protocol because such a disk is being used only by whichever one node is the active node at any point of time. Using regional persistent disks enables the active node and the passive node to withstand a zone failure.

The public clouds such as Amazon Wes Services, Azure, and Google Cloud Platform provide various shared disks, each with its own limitations. The table 300 depicted by FIG. 3 summarizes the shared disk specifications for each public cloud provider. In conclusion, the high availability nodes may be configured within the same availability zone for Amazon Web Services 302 and optionally for the Google Cloud Platform 304, whereas these disks are configured to be zone redundant for Azure 306 and optionally for the Google Cloud Platform 308.

The Google Cloud Platform 304 enables an active node that executes a backup/restore application and a passive node that executes the backup/restore application to be created, deployed in the same availability zone in a region, or between two zones in the same region, in the Google Cloud Platform, and kept in the private subnet with the private addresses. Then a zonal solid-state persistent disk is created, which subsequently results in the active node and the passive node which are deployed. The "multiWriter" option is selected that attaches the disk to the active node and the passive node. Then object storage is created for backup data from the active node and the passive node, which are in the same availability zone or between two zones in the same region where the active node and the passive node are deployed.

Floating internet protocol is a commonly used procedure for high availability systems. In the context when a primary (active) node 402A is no longer functional, the floating internet protocol address is assumed and configured onto a secondary (passive) node 404A. In on-premises environments, during a failover the node 404A that will become the primary node can use gratuitous address resolution protocol to announce this change to the switch so that the traffic interruption time will be minimized. However, in public cloud environments, the virtual private cloud networks use software defined networks, such that making changes on a host or trying to update a nearby switch with a gratuitous address resolution protocol may not function properly. Various possibilities exist for configuring and transferring floating internet protocol addresses between the active node 402A and the passive node 404A during a high availability failover in a few cloud provider environments.

For Amazon Web Services, there will be two virtual instances with their own primary interface and internet protocol address. In this model, each instance has been given the privilege to assign a new private internet protocol address itself. The system adds a secondary internet protocol address to the primary instance's interface, which may be referred to as a floating internet protocol address.

Figure 4:
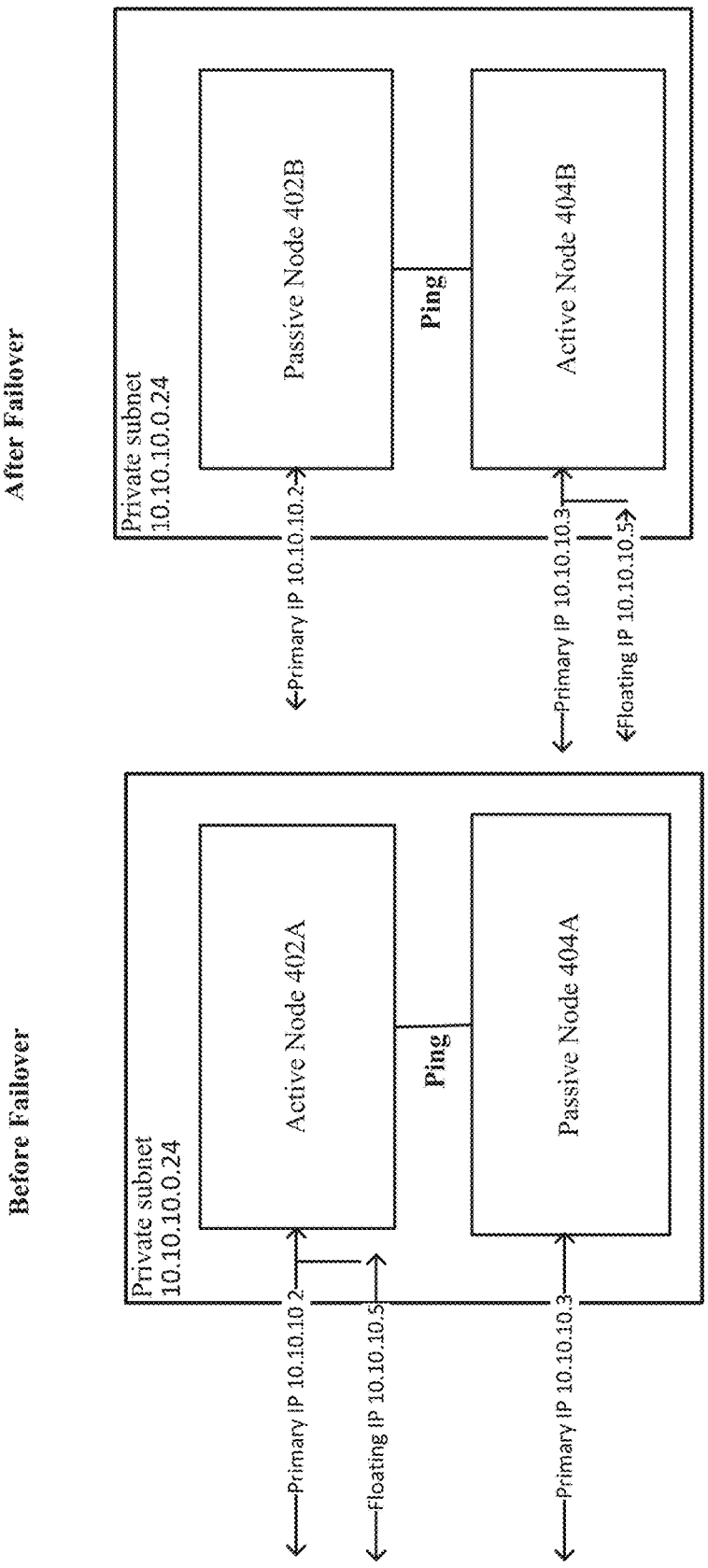
FIG. 4 illustrates a block diagram of an example of a floating internet protocol address moving from an active node to a passive node, which provides high availability of a backup/restore application in a public cloud, under an embodiment.

While applications use this floating internet protocol address to reach services, there will be independent monitoring or heartbeat services running in a high availability pair of an active node 402A and a passive node 404A. Once a secondary (passive) node 404A detects that there is problem with its paired primary (active) node 402A, then the secondary node 404A triggers a reassignment/reconfiguration of the floating internet protocol address to its network interface. In this model, a secondary node 404A, which is going to become the primary node 404B, will preempt the floating internet protocol address from its current primary node and configure the address as a secondary internet protocol address on its network interface. FIG. 4 illustrates the floating internet protocol address moving from an active node 402A to a passive node 402B, thereby providing high availability 400 in a public cloud, under an embodiment.

The system can move a floating internet protocol address from one storage system to another storage system with the help of Azure's command-line interface. As a pre-requisite for this procedure, a virtual machine, such as the Data Domain Virtual Edition high availability node running in the Azure public cloud, should have the Azure command-line interface installed. The high availability mechanism should be able to re-configure and/or self-assign the floating internet protocol address by running the Azure command-line interface.

However, the Azure command-line interface should have enough privileges to perform this operation. This is commonly expected by any program/application/script that is making changes to a virtual machine. Therefore, a service principal needs to be created and give its contributor access to the resource group. As part of this operation the resulting JSON (Java Script Object Notation) file will have the name, password, and tenant details which may be fed to a script to gain necessary privileges to perform the floating internet protocol address reconfiguration. When multiple private internet protocol addresses are configured on the same virtual network interface, they must belong to the same subnet.

As described above, the Google Cloud Platform uses a virtualized network stack where using gratuitous address resolution protocol-like procedures will fail. One of the alternatives is using an overlay network that enables the control over Layer 2. The system can use address resolution protocol requests for a switchover, but this approach may be too complex and probably not feasible for many customers' system administrators. As an alternative, alias internet protocol addresses may be used for floating internet protocol addresses. In this approach a virtual machine needs to specify an alias internet protocol address range, which can include one internet protocol address with /32 addresses or it may be a subnetwork address.

The idea is to transfer this alias internet protocol address range from one virtual machine to another virtual machine in that high availability pair of nodes, whichever is the active node. The caveat in this approach is that, to remove an alias internet protocol range of addresses from one virtual machine and transfer it to another virtual machine, might take up to a minute for the transfer, which is the current limitation. Once the internet protocol address range is transferred to another virtual machine using the Google Cloud Platform's command-line interface, then the internet protocol addresses have to be configured inside the virtual machine and on its operating system.

In Data Domain Virtual Edition instances deployed in a public cloud with object storage solutions, both the data and the filesystem metadata reside in an object storage bucket. Each object storage bucket is owned by a single Data Domain Virtual Edition instance. Only the object storage bucket owner can have read and write permissions on the object storage bucket. The object storage bucket is attached, owned, and locked with the instance when the filesystem is created.

When a high availability pair of nodes is created, the filesystem gets created on the active node. During the object storage bucket locking process, the active node creates a heartbeat object and uses a PUT operation to write the heartbeat object to the object storage bucket. This heartbeat object contains the system identifier of the active node and the timestamp when the heartbeat object was last modified.

The active node is the object storage bucket owner and has the read and write access to the object storage bucket.

Every heartbeat interval, the active node uses a GET operation to read the heartbeat object from the object storage bucket and compare the active node's own system identifier with the system identifier that is in the heartbeat object. If the two system identifiers match, then the active node updates the timestamp of the heartbeat object and writes the heartbeat object back to the object storage bucket to maintain the active node's ownership over the object storage bucket. The passive node has only read access to the object storage bucket. For every heartbeat interval, the passive node uses the HEAD operation to read the metadata for the heartbeat object and validate its connectivity to the object store bucket.

All cloud providers support strong consistency for read after write operations to cloud storage. Strong consistency means that after a successful write operation of an object to cloud storage, an application that reads the object immediately afterwards will always get the latest version of the object. The strong consistency feature is utilized in the object storage bucket locking design to ensure that all updates to the heartbeat object are immediately visible to both the active and passive nodes during subsequent read operations.

This visibility of data is critical for maintaining the lock ownership by the active node during normal high availability operation. Due to strong consistency support, when a high availability failover occurs, the passive node can immediately update the heartbeat object with its system identifier and take ownership of the object storage bucket. Any subsequent read operation of the heartbeat object reflects the updated object storage bucket ownership.

Optimistic concurrency control is a critical requirement for object storage bucket locking with high availability nodes. A high availability pair of nodes in a cloud ensures that the heartbeat object in the object storage bucket is never updated concurrently by the active and passive nodes in any failover orchestration scenario. This restriction is needed to prevent filesystem data corruption resulting from unprotected updates to the heartbeat object. To achieve this goal, the concept of optimistic concurrency and protected writes is leveraged in the object storage bucket locking design.

In this method of concurrency control, two users can update a data resource without overwriting the data from each other's transactions. As part of the update, user A can determine whether the data has been modified by any of users B-Z since user A last read the data. During the update transaction from user A, if the data resource has been modified by another transaction from any of users B-Z, the transaction from user A fails and it is notified of the failure. As an example of optimistic concurrency, if a first user and a second user viewing a wiki page make a first update and a second update to that page, then the wiki platform must ensure that the second update does not overwrite the first update.

Optimistic concurrency is used in environments with low contention for data, is supported by most cloud providers, and is ideal for preventing heartbeat object corruption during failover orchestration. Cloud providers support conditional PUT operations for cloud storage as a means for providing optimistic concurrency control. A conditional PUT operation is always used to write the heartbeat object in the object storage bucket.

In the Google Cloud Platform, each object has its generation number which represents the current live version of the object. Every time an object is updated, a new generation version is assigned to the updated object. Generation numbers of objects are not dependent upon enabling object storage bucket versioning. When a GET object operation is executed, the generation number for the current version of the object is obtained in the response header.

For the object storage bucket locking use case, the generation number for the heartbeat object is obtained when the heartbeat object is read from the object storage bucket. When a PUT operation is done to update the system identifier and/or update the last modified timestamp for the heartbeat object, the x-goog-if-generation-match header is sent with the PUT request. In this header, the generation number previously obtained is sent with the PUT object request. When this header is used, the PUT operation will only be successful if the generation of the heartbeat object in Google Cloud Platform cloud storage matches with the value being sent with the PUT request.

Consequently, if both the passive and active nodes are concurrently trying to update the heartbeat object, one of them will get a precondition fail error response #412 and will not be able to update the heartbeat object. The other node will be able to take ownership of the object storage bucket. An etag is conceptually like a generation number for conditional write operations. The Google Cloud Platform only supports the use of conditional etag headers like if-match for GET operations, but it does not support that for PUT operations.

Azure supports the use of etags for conditional PUT operations. An etag is a hypertext transfer protocol (HTTP) response header that identifies a specific version of an object. Whenever an object is updated, a new etag version is generated for the object and returned in the response header. When a GET object operation is executed, the etag for the current version of the object is obtained in the response header.

For the object storage bucket locking use case, the etag for the heartbeat object is obtained when the heartbeat object is read from the object storage bucket. When the system executes a PUT operation to update a system identifier and/or update the last modified timestamp for the heartbeat object, the system sends the "if match" conditional header with the PUT request. In this header, the etag value previously obtained is sent with the PUT object request. When this header is used, the PUT operation will only be successful if the etag of the heartbeat object in the Azure container storage matches with the etag value being sent with the PUT request. So, if both the passive and active nodes are concurrently trying to update the heartbeat object, one of the nodes will get a precondition fail error response #412 and will not be able to update the heartbeat object, while the other node will be able to take ownership of the object storage bucket.

Figure 5:
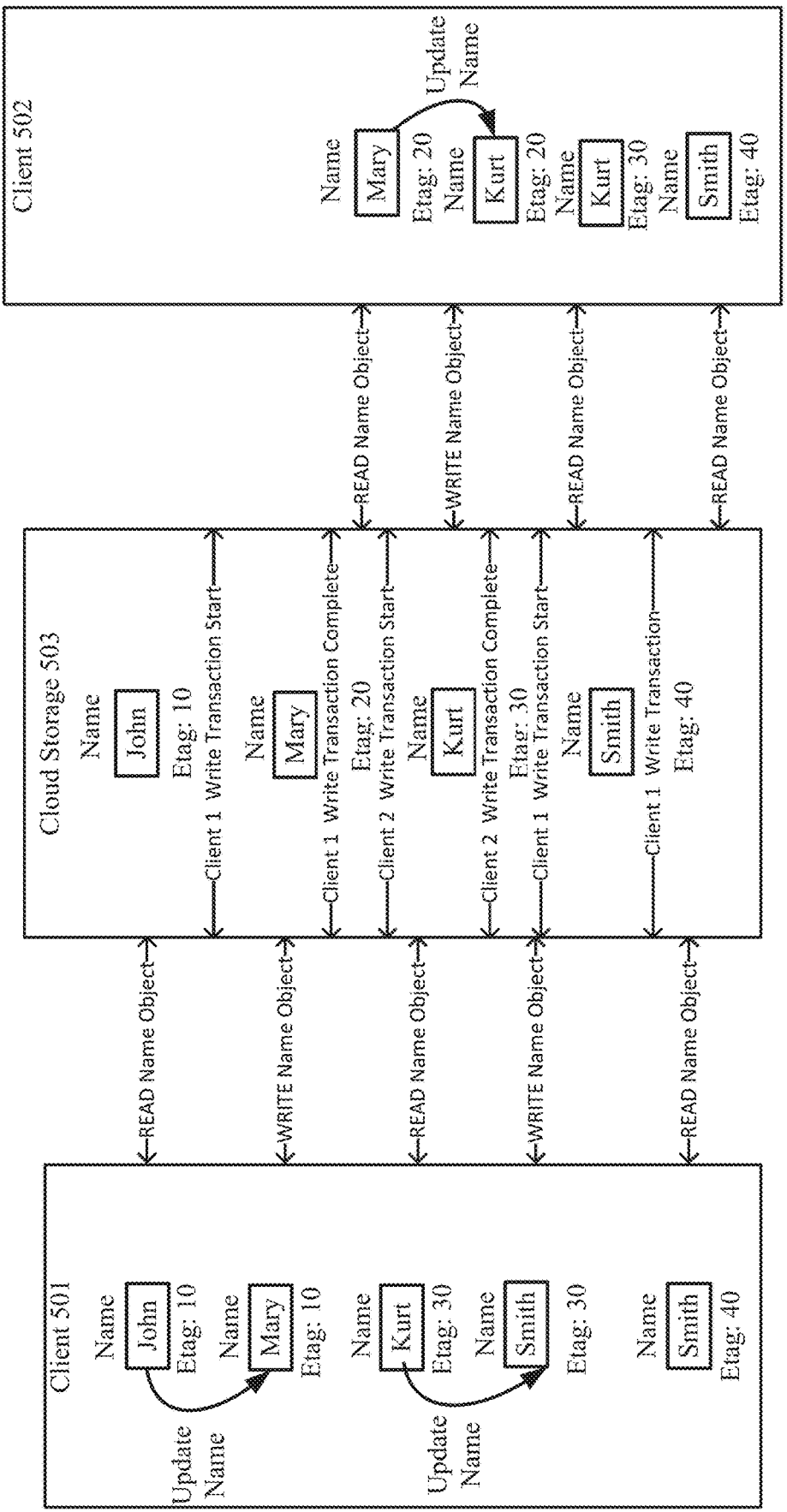
FIG. 5 illustrates a block diagram of an example of strong consistency and updates to etags with changes to an object, which provides high availability of a backup/restore application in a public cloud, under an embodiment.

FIG. 5 depicts an example of strong consistency and updates to etags with changes to an object, thereby providing high availability in a public cloud 500, under an embodiment. Client 501 reads a name object from a public cloud storage 503, updates the local copy of the name object from John to Mary and writes back the updated name object to the public cloud storage 503. After the write operation completes successfully, the name object in the public cloud storage gets updated to Mary and its etag changes from 10 to 20. Similarly, client 502 updates the name object from Mary to Kurt in the public cloud storage 503 and after the write operation, the etag for the name object changes from 20 to 30.

Client 501 again reads the name object from the public cloud storage and tries to update the name object from Kurt to Smith. Client 502 tries to read the name object before the completion of the write operation from client 501. Client 502 reads the old value of the name object as Kurt and the etag as 30. After the completion of write operation successfully by client 501, the name object in the public cloud storage 503 is updated from Kurt to Smith and the etag is updated from 30 to 40. Immediately after the completion of the write operation, client 502 again tries to read the name object and this time receives the updated name object and the associated etag value.

Figure 6:
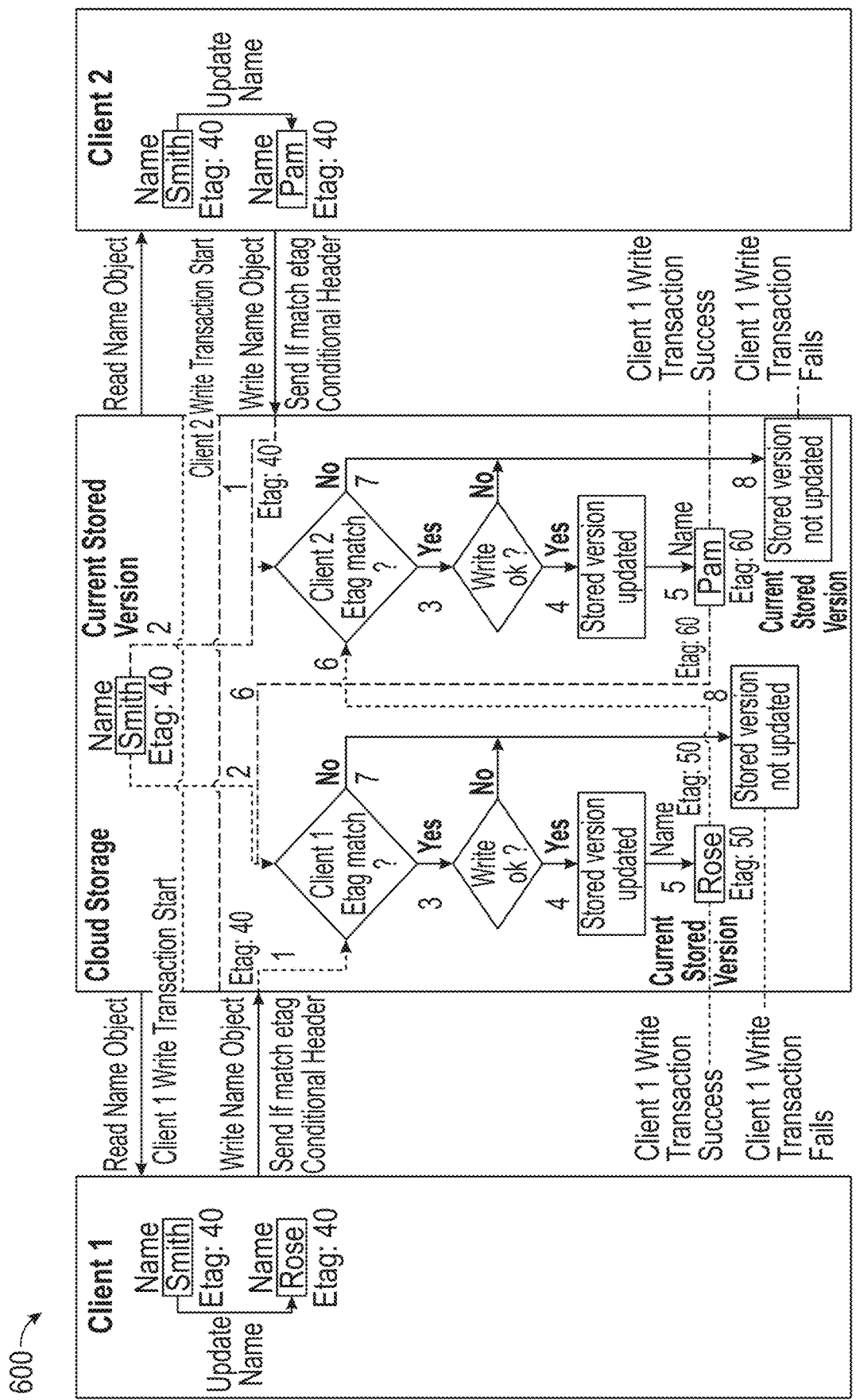
FIG. 6 illustrates a block diagram of example protected write operations with etags, which provides high availability of a backup/restore application in a public cloud, under an embodiment.

FIG. 6 depicts an example of protected write operations 600 to a public cloud storage with etags. Client 1 initiates a conditional write (with an etag if match header) to update the value of a name object from Smith to Rose. Concurrently, client 2 initiates a conditional write to update the name object from Smith to Pam. This combination of conditional write operations will cause an etag collision for the conditional write operations to the same name object.

The cloud provider will commit the conditional write operation from one of the clients, while the other client will receive a failure notification. In this example, only one of the clients will be able to successfully update the name object and its corresponding etag in the public cloud storage. For the other client, the etag would not match the value in the conditional header and the etag precondition check will fail. The corresponding client will be notified of the failure and will be able to retry the conditional write operation again.

The sequence of steps which occur if client 1 succeeds in the conditional write operation, is depicted in red in FIG. 6. Client 1 sends a PUT request with an if match etag header value of 40. The etag value in the if condition header matches the current etag version in the public cloud storage, which is 40. Since the etag value match, the conditional write operation is successful, the current version of the name object is updated to Rose, and the etag is updated to 50.

Client 2 also concurrently sends a conditional PUT request with an etag value of 40. The current etag version for the name object is now 50. The etag conditional headers for client 2 will not match the current etag version, and the precondition will fail. Client 2 is not able to update the current version of the name object to Pam, so the write transaction for client 2 fails.

The sequence of steps which occur if client 2 succeeds in the conditional write operation, is depicted in green by FIG. 6. Since client 2 sends the PUT request with an if match etag header value of 40, the etag value in the if condition header is matched with the current etag version in the cloud storage, which is 40, the conditional write operation is successful, the current version of the name object is updated to Pam, and the etag is updated to 60. Since client 1 also concurrently sends a conditional PUT request with an etag value of 40, and the current etag version for the name object is now 60, the etag conditional headers for client 1 will not match the current etag version, and the precondition will fail. Since client 1 is not able to update the current version of the object to Rose, the conditional write operation for client 1 fails.

Azure also provides an option to lease a pessimistic concurrency lock for an object from a short duration to a long duration. This lease option can also be used to securely update the heartbeat object. The lease duration ranges from a few seconds to infinite time depending upon the application use case. To use the lease blob operation for every update to the heartbeat object, there will be an additional overhead and performance impact of acquiring and releasing the lease. For this reason, etags are used instead of lease option for the Azure container locking requirements.

Amazon Web Services do not yet support conditional object storage PUT operations, but do support strong consistency. Both the active node and the passive node will utilize the strong consistency feature to validate that writes to the heartbeat object reflect the latest update. During failover orchestration, the passive node will wait for the PUT operation timeout interval before claiming ownership of the object storage bucket. Waiting for the timeout interval ensures that the passive node does not overwrite any in-flight PUT operations from the active node. The passive node will periodically poll for updates in the heartbeat object during the PUT timeout interval.

If the heartbeat object remains unchanged after the lapse of the PUT timeout interval, the passive node can proceed with claiming ownership of the object storage bucket. Due to a cloud infrastructure issue, there may be a corner case in which the passive node's PUT operation takes a longer time to complete. During this period, the active node can come back online and try to update the heartbeat object to maintain its ownership. This can lead to heartbeat object getting corrupted due to concurrent updates from the active and passive nodes. For this reason, during every boot cycle, the active node will always wait for PUT time interval before claiming ownership of the object storage bucket.

The failover orchestration on the passive node will be triggered by one of the following two scenarios: the active node loses connectivity with the object storage, or the operating system is unresponsive on the active node. If the active node loses connectivity with the object store, the active node will no longer be able to update the heartbeat object every heartbeat interval, and the active node will retry the read and write operations with exponential backoff for a heartbeat timeout interval. If the active node is still not able to update the heartbeat object, the high availability software will initiate the failover process, the active node will release the storage and network resources, and will not be making any attempts to read or update the heartbeat object in the object storage bucket. If the active node can successfully relinquish all the resources within a timeout period, the high availability software will proceed with the failover of the Data Domain services and protocols, and the active node will then be rebooted.

Once the failing node successfully releases all the resources, the passive node attempts to take over the resources and services, and will read the heartbeat object and obtain its etag. The passive node will replace the existing system identifier in the heartbeat object with the passive node's own system identifier, and update the last modified timestamp. The passive node will then do a conditional PUT operation by sending the etag from the read operation in the "if-match" header for the PUT HTTPS request.

If the conditional PUT operation succeeds, the passive node will become the new owner of the object storage bucket and proceed to degraded state. The passive node will do periodic read and write operations to maintain ownership of the object storage bucket. The passive node will remain in the degraded state until a peer node is online, when the passive node will become the new active node, and the peer node will become the new passive node.

Figure 7:
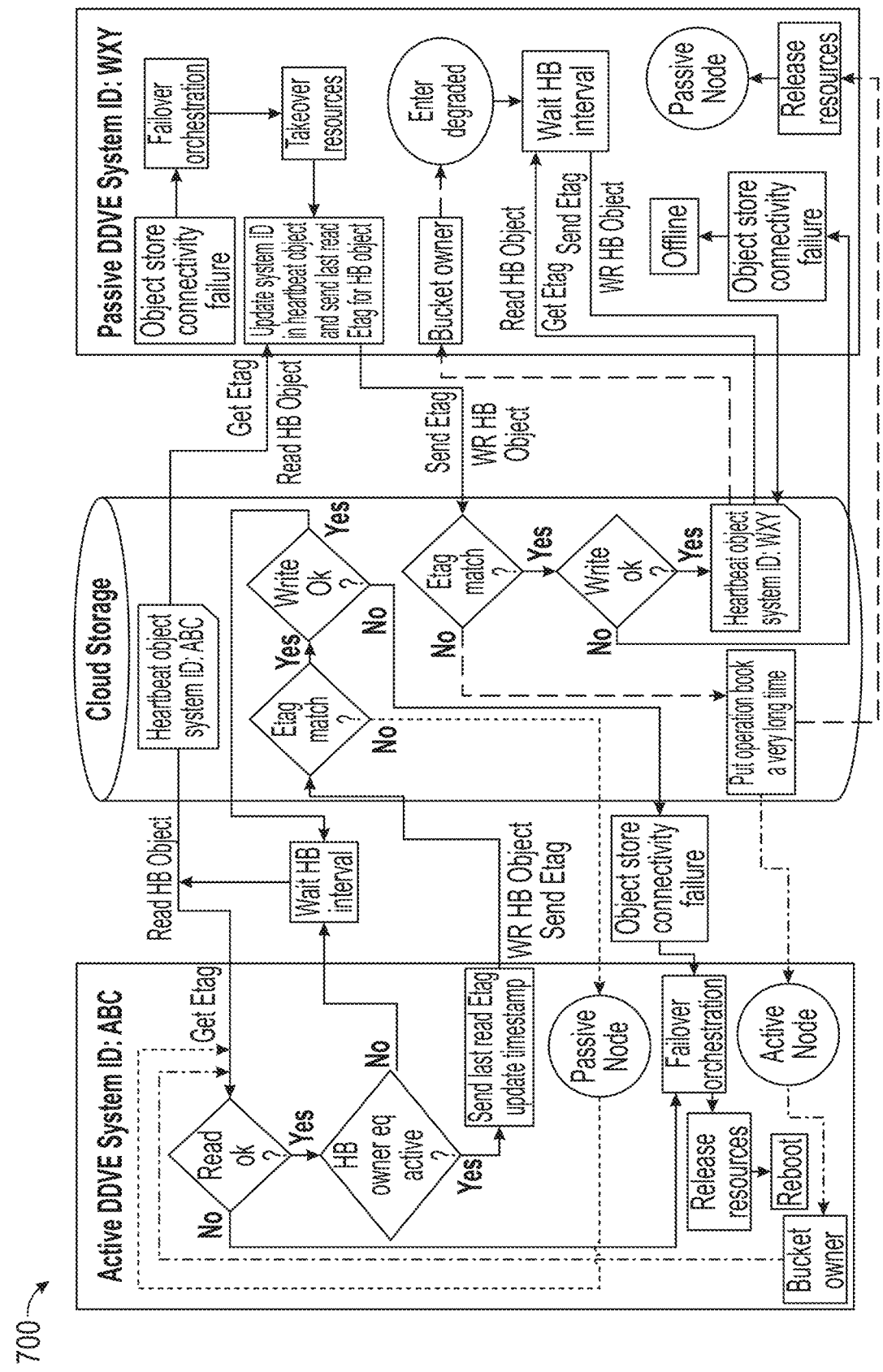
FIG. 7 illustrates a block diagram of an example failover orchestration when an active node loses connectivity to an object store, which provides high availability of a backup/restore application in a public cloud, under an embodiment.

If the PUT operation fails due to an eTag conflict, this failure indicates that the passive node's PUT operation took too long to complete, and in the meanwhile the active node came online and read the heartbeat object from the object storage bucket, which showed that the active node was still the owner of the object storage bucket. In this situation, the active node attempts a conditional PUT request to update the last modified time in the heartbeat object, succeeds, and reacquires all the resources from the passive node, such that the status of the active and passive node will remain unchanged. If the PUT operation fails with any other error, the passive node will relinquish all the resources and will be offline. The failover orchestration for an active node's loss of connectivity to the object store is depicted in FIG. 7.

The operating system on the active node may become unresponsive due to situations such as a kernel panic or an underlying hypervisor issue. In such situations, the passive node will not be able to detect the interconnect heartbeat from the active node. The active node will get rebooted and the high availability software on the passive node will initiate the failover orchestration. The passive node attempts to take over all the resources and services. In this scenario, the passive node uses a process for obtaining the object storage bucket ownership that is the same process as when the active node loses connectivity to the object store as described above.

Making a traditional high availability application work in a public cloud would require redesigning the application's architecture. Consequently, there has been no existing high availability solution in a public cloud that is similar to solutions for traditional appliances in the public cloud. This disclosure provides high availability in a public cloud for traditional virtual appliances such as Data Domain Virtual Edition.

To create high availability in a public cloud for traditional applications and appliances, the system combines the existing high availability systems for on-premises appliances and cloud native features available for disk, network, and object store. In a public cloud, Data Domain Virtual Edition uses meta-separated architecture, which makes use of both block storage and object storage. However, sharing metadata disks and object storage between high availability nodes in a public cloud is another challenge, which may be overcome by a cloud native procedure for disk sharing and a new elegant procedure for object storage bucket locking. The system also leverages floating internet protocol address concept for public cloud providers that are inherently required for any high availability system.

Figure 8:
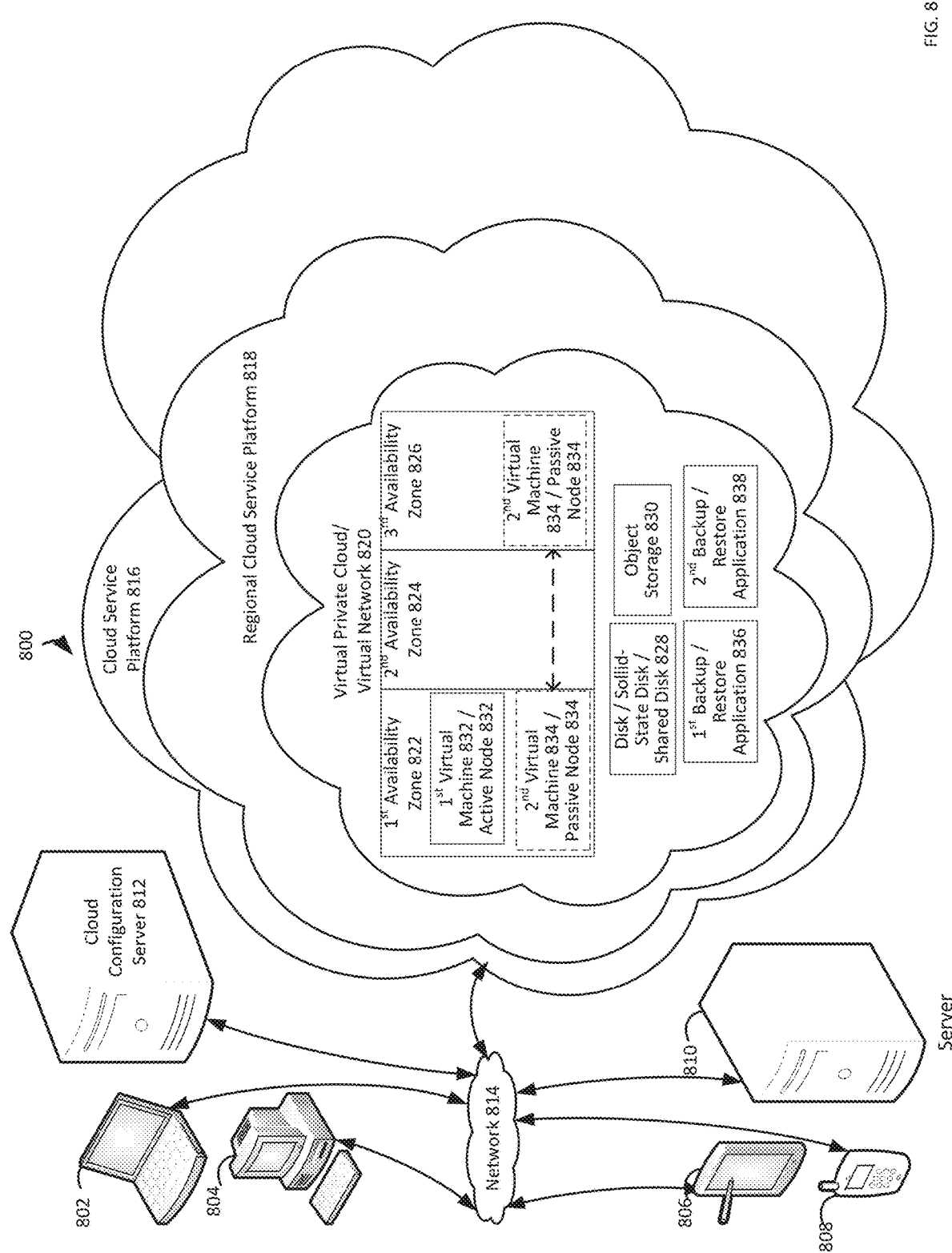
FIG. 8 illustrates a block diagram of an example system which provides high availability of a backup/restore application in a public cloud, under an embodiment.

FIG. 8 illustrates a diagram of a system 800 for providing high availability for backup/restore applications in a public cloud. As shown in FIG. 8, the system 800 may illustrate a cloud computing environment in which data, applications, services, and other application resources are stored and delivered through shared data centers and appear as a single point of access for the users. The system 800 may also represent any other type of distributed computer network environment in which servers control the storage and distribution of application resources and services for different client users.

In an embodiment, the system 800 represents a cloud computing system that includes a first client 802, a second client 804, a third client 806; a fourth client 808; a fifth client 810, and a cloud configuring server 812. The first client 802 may be a laptop computer 802, the second client 804 may be a desktop computer 804, the third client 806 may be a tablet computer 806, the fourth client 808 may be a smart phone 808, and the fifth client 810 may be a server 810. The clients 802-810 and the cloud configuring server 812 communicate via a network 814.

The system 800 may access a cloud service platform 816, which may include a regional cloud service platform 818, which may include a virtual private cloud/virtual network 820, which may include at least one of the availability zones 822-826, at least one disk 828, and at least one object storage 830. FIG. 8 depicts the system 800 with five clients 802-810, one cloud configuring server 812, one network 814, one cloud service platform 816, one regional cloud service platform 818, and one virtual private cloud/virtual network 820. However, the system 800 may include any number of each of the clients 802-810, the cloud configuring server 812, the network 814, the cloud service platform 816, the regional cloud service platform 818, and the virtual private cloud/virtual network 820. The at least one of the availability zones 822-826 include at least one of the virtual machines 832-834, which execute at least one of the backup/restore applications 836-838. The dashed line which connects the first instance of the $2^{nd}$ virtual machine 834/passive node 834 in the availability zone 822 and the second instance of the $2^{nd}$ virtual machine 834/passive node 834 in the availability zone 826 indicate that the passive node can be in the same availability zone 822 as the 1st virtual machine 832/active node 832 or in a different availability zone 826 than the 1st virtual machine 832/active node 832.

The backup/restore application 836 (and/or 838) creates backup files of data objects for the clients 802-810, and can perform a restore operation based on the backup files stored on the object storage 830. The backup/restore application 836 provides centralized administration, such as scheduling, monitoring, and managing backup operations and backup files. The backup/restore application 836 enables the storing of backup operation schedules, client policies, and client configurations.

The backup/restore application 836 provides a unique interface to the clients 802-810 during login, and assists the server 810 in authenticating and registering the clients 802-808. The backup/restore application 836 can send backup/restore work orders to the clients 802-810, which may receive and process the work orders to start a backup or restore operation. The backup/restore application 836 may execute server-side processes for a system administrator's graphical management console, which may enable the system administrator to use command line interface tools for queries. Although this disclosure describes Dell's Data Domain Virtual Edition as an example of the backup/restore application 836, the backup/restore application 836 may be any other type of backup/restore application which provides the backup/restore functionalities described in this disclosure.

Figure 9:
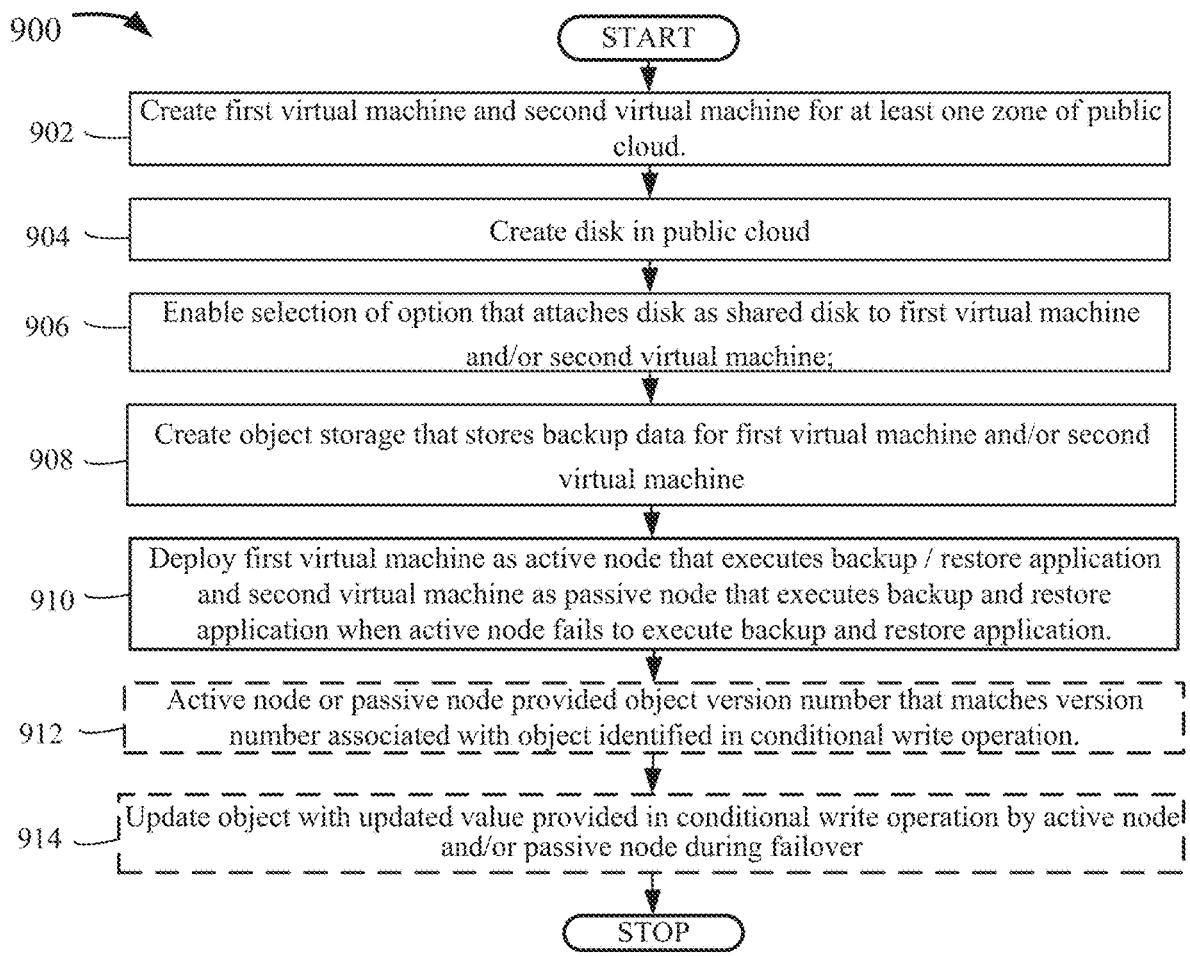
FIG. 9 is a flowchart that illustrates an example method which provides high availability of a backup/restore application in a public cloud, under an embodiment.

FIG. 9 is a flowchart 900 that illustrates a method for providing high availability for backup/restore applications in public clouds. Flowchart 900 depicts method acts illustrated as flowchart blocks for certain steps involved in the clients 802-810, the cloud configuring server 812, the network 814, and/or the cloud service platform 816 of FIG. 8.

A first virtual machine and a second virtual machine are created for at least one zone of a public cloud, block 902. A system creates virtual machines to be deployed as active and passive nodes. For example, and without limitation, this can include the cloud configuring server 812 creating a first virtual machine 832 and a second virtual machine 834 in an availability zone 822 in the US-West (Oregon) region 818 in Amazon Web Services 816. In an alternative example, the cloud configuring server 812 configures an Azure public cloud to provide two Azure virtual machines 832-834 across two Azure availability zones 822 and 826 in the West US 2 (Washington) region 818 in the Azure public cloud 816, thereby enabling recovery from an availability zone failure. In another alternative example, the cloud configuring server 812 configures a Google Cloud Platform 816 to create a first virtual machine 832 and a second virtual machine 834 in the same availability zone 822 in the Los Angeles region 818 of the Google Cloud Platform 816, or between two of the availability zones 822-826 in the same LA region 818 in the Google Cloud Platform 816.

A virtual machine can be a software implementation of a computer that executes programs like a physical computer. A zone can be a logical data center in a region. A public cloud can be networked computing facilities providing remote data storage and processing services via the internet.

At least one zone may be the same availability zone for the active node and for the passive node, or one of a first availability zone for the active node and a second availability zone for the passive node, wherein the first availability zone and the second availability zone are different availability zones in a same region. For example, FIG. 1 describes two virtual machines 102 and 106 in the same availability zone 109, while FIG. 2 describes two virtual machines 204 and 206 in two different availability zones 210 and 214 in the region 216. An availability zone can be a logical data center in a region available for use by any cloud customer. Each availability zone in a region has redundant and separate power, networking and connectivity to reduce the likelihood of two availability zones failing simultaneously. A region can be an area or division, especially part of a country or the world having definable characteristics but not always fixed boundaries.

After creating virtual machines in a public cloud, a disk is created in the public cloud, block 904. The system creates a disk to be shared by high availability nodes. By way of example and without limitation, this can include the cloud configuring server 812 creating a IO2 solid-state disk 828 in the same availability zone 822 in Amazon Web Services 816 and sets the disk type and the disk size to provide the required inputs/outputs per second. In an alternative example, the cloud configuring server 812 creates a zone-redundant premium solid-state disk 828, which are collectively managed as a single premium solid-state disk 828, across the two Azure availability zones 822 and 826 where the active and passive nodes are running in the same West US 2 region 818 in the Azure public cloud 816, thereby enabling recovery from an availability zone failure. In another alternative example, the cloud configuring server 812 configures the Google Cloud Platform 816 to provide a zonal or regional solid-state persistent disk 828 to be shared by the two virtual machines 832 and 834, which become the Data Domain Virtual Edition high availability active node 832 and passive node 834.

A disk can be an information storage device for a computer, with the data stored either magnetically (in a magnetic disk) or optically (in an optical disk such as a CD-ROM). The disk may be a solid-state disk which is in the same availability zone where the active node and the passive node are deployed, or in the same region where the active node and the passive node are deployed. For example, FIG. 1 depicts a disk 116 that is in the same availability zone 1098 as two nodes 102 and 106, while FIG. 2 depicts a disk 208B that is in a different availability zone 212 than the availability zones 210 and 214 where two nodes 204 and 206 are located. A solid-state disk can be a type of storage device used in computers, whereby non-volatile storage media stores persistent data on flash memory.

Following the creation of virtual machines and a disk, a selection is enabled to attach a disk as a shared disk to a first virtual machine and/or a second virtual machine, block 906. The system attaches a shared disk to the high availability nodes. In embodiments, this can include the cloud configuring server 812 enabling an Amazon Web Services-trained administrator to select an "enable multi-attach" option which attaches the IO2 solid-state disk 828 to the two virtual machines 832-834, thereby becoming a shared disk 828.

In an alternative example, the cloud configuring server 812 provides the option "Enable shared disk" which makes the zone-redundant storage premium solid-state disk 828 sharable among the two Azure virtual machines 832-834. In another alternative example, the cloud configuring server 812 configuring a Zonal solid-state persistent disk to be sharable by the two Azure virtual machines 832-834 by enabling the "multiWriter" property during the disk creation, while regional solid-state persistent disks may be attached to only one virtual machine or node at a time. Therefore, during a failover, the high availability subsystem forces the attachment of the regional solid-state persistent disk 828 from the failed high availability active node 832 to the high availability passive node 834. A selection can be the action or fact of carefully choosing something as being the best or most suitable. A shared disk can be an information storage device for a computer, whereby non-volatile storage media stores persistent data on flash memory, with its use distributed between members of a group.

Having attached a disk to virtual machines, an object storage is created to store backup data for the first virtual machine and/or the second virtual machine, block 908. The system creates object storage to store backup data from any active node. For example, and without limitation, this can include the cloud configuring server 812 creating a) object storage bucket 830 for storing backup data for the two virtual machines 832-834. In an alternative example, the cloud configuring server 812 creating a hot blob object storage account 830, which organizes data based on how frequently the data will be accessed and how long the data will be retained, for backup data from the two Azure virtual machines 832-834, in the same West US 2 region where the two Azure virtual machines 832-834 were created. In another alternative example, the cloud configuring server 812 creates object storage 830 for storing backup data for the two virtual machines 832-834 which become the active node 832 and passive node 834 in the Google Cloud Platform 816.

Object storage can be distinct units of information that are kept at a single location and are not ingrained in files inside other folders, and which combine the pieces of information that make up a file, add all its relevant metadata to that file, and attaches a custom identifier. Backup data can be a copy of the information on a system that is used for recovery in case the original data is lost or corrupted. Object storage may be a bucket or a hot blob storage account, which is in the same region where the active node and the passive node are deployed and which stores data for at least one of the active node or the passive node. For example, FIG. 1 depicts an object storage bucket 118 that is in the same region 110 where the active node 102 and the passive node 106 are deployed and which stores data for at least one of the active node 102 and the passive node 106. A bucket can be a software and/or hardware container for objects A hot blob storage account can be the organization of data based on how frequently the data will be accessed and how long the data will be retained.

After creating virtual machines, a disk, and a storage, a first virtual machine is deployed as an active node that executes a backup/restore application and a second virtual machine is deployed as a passive node that executes the backup/restore application when the active node fails to execute the backup/restore application, block 910. The system deploys the high availability nodes to protect client data. By way of example and without limitation, this can include the cloud configuring server 812 deploying the first virtual machine 832 as an active node 832 that executes a backup/ restore application 836 and the second virtual machine 834 as a passive node 834 that executes the backup/restore application 838 when the active node 832 fails to execute the backup/restore application 836.

In an alternative example, the cloud configuring server 812 deploys the two Azure virtual machines 832-834 as an active node 832, which executes the backup/restore application 836, and a passive node 834, which executes the backup/restore application 838 when the active node 832 fails to execute the backup/restore application 836, in different availability zones 822-826 within the same West US 2 region 818 in the Azure public cloud 816. In another alternative example, the cloud configuring server 812 deploys the two virtual machines 832-834 as an active node 832 that executes the backup/restore application 836 and a passive node 834 that executes the backup/restore application 838 when the active node 832 fails to execute the backup/restore application 836, which may be deployed in the same availability zone 822-826 in the LA region 818, or between two zones in the same LA region 818, in the Google Cloud Platform 816. The backup/restore application may be deduplication software that optimizes data storage by removing redundant data stored on object storage. A floating internet protocol address may be used to direct input data for an active node, which is failing to execute the backup/restore application, to a passive node which became a new active node, in response to the active node failing to execute the backup/restore application. For example, FIG. 4 depicts a floating internet protocol address that redirects data sent for the active node 832 and delivers the data to a passive node 834 which becomes the new active node.

An active node can be a computer that processes requests with a hot spare that is ready to go in a disaster, while a passive node can be a computer that is the hot spare which is ready to go in a disaster. Deduplication software can be executable code that eliminates excessive copies of data and significantly decreases storage capacity requirements, which can be run as an inline process as the data is being written into the storage. Data storage can be information that is retained to be subsequently used by a computer. Data can be information that is stored, processed and/or sent by a computer. Input data can be information that is received by a computer. A floating internet protocol address can be a unique string of characters that identifies each computer which communicates over a network, and which are not settled in a definite place.

After deploying virtual machines as an active node and a passive node, an active node or a passive node optionally provides an object version number that matches a version number for an object identified in a conditional write operation, block 912. The system can provide a version number to access an object. In embodiments, this can include the cloud storage determining that an object version number provided by an active node 832 or a passive node 834 matches a version number associated with an object identified in a conditional write operation.

A version number can be a unique sequence of digits which identifies the state of development of computer software. An object version number can be a unique sequence of digits which identifies the state of development of computer information. An object storage can be a data construct that provides a description of something that may be used by a computer and defines its status, its method of operation, and how it interacts with other objects. A conditional write operation can be a step in a computer program that determines which of two or more instructions or instruction sequences to execute. An object storage can be the retention of retrievable data on a computer or other electronic system.

Following the matching of object's version numbers, the object is updated with an updated value provided in a conditional write operation by an active node or a passive node during a failover, block 914. The system allows a node to update an object in an object store if the node provides an access value for the object. For example, and without limitation, this can include the cloud storage updating an object with an updated value provided in a conditional write operation by the active node 832 or the passive node 834 during a failover. An updated value can be information that was revised. A failover can be a method of protecting computer systems from loss and/or malfunctions, in which standby equipment automatically takes over when the main system fails.

Although FIG. 9 depicts the blocks 902-914 occurring in a specific order, the blocks 902-914 may occur in another order. In other implementations, each of the blocks 902-914 may also be executed in combination with other blocks and/or some blocks may be divided into a different set of blocks.

Figure 10:
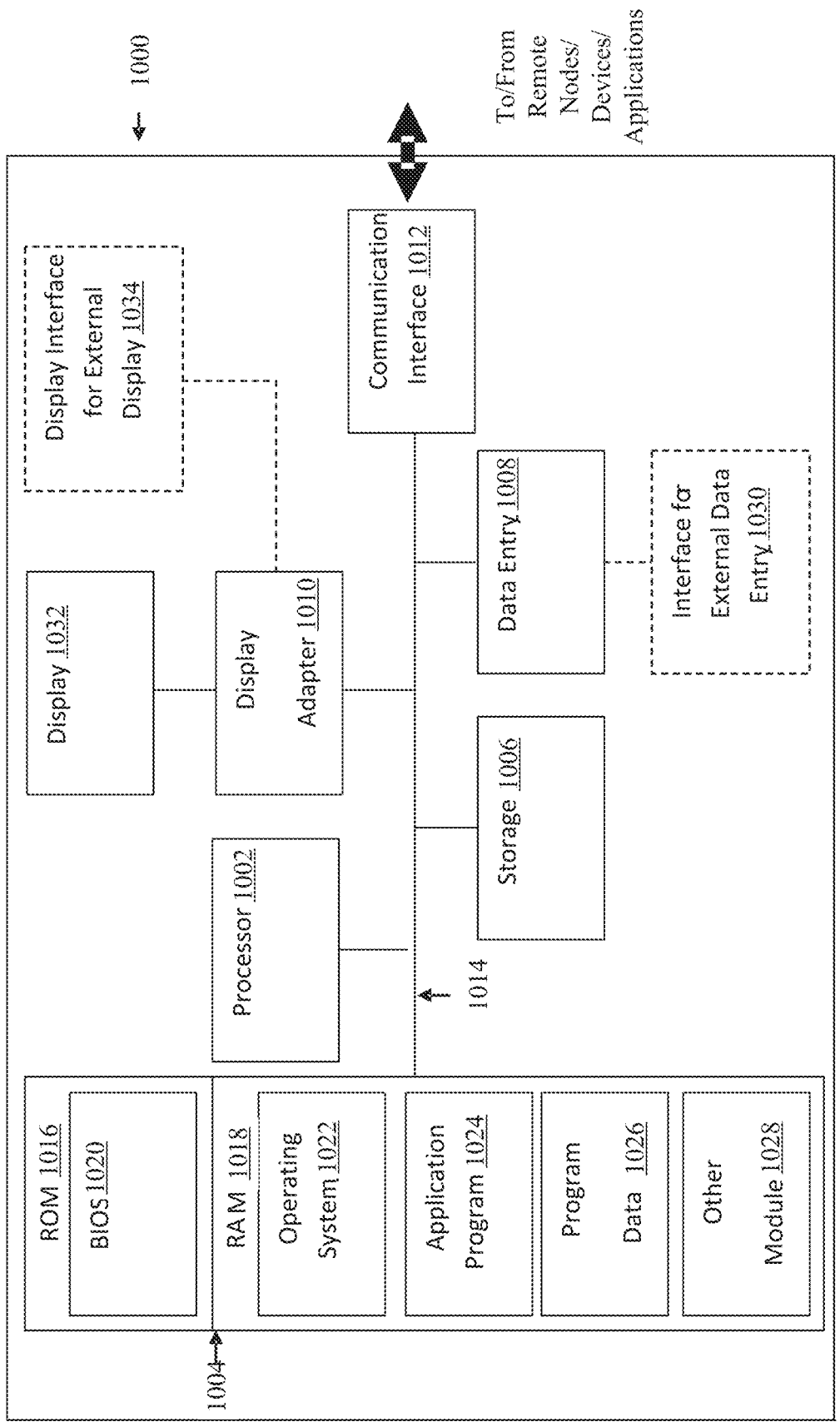
FIG. 10 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 10 may vary depending on the system implementation. With reference to FIG. 10, an exemplary system for implementing the subject matter disclosed herein includes a hardware device 1000, including a processing unit 1002, memory 1004, storage 1006, a data entry module 1008, a display adapter 1010, a communication interface 1012, and a bus 1014 that couples the elements 1004-1012 to the processing unit 1002.

The bus 1014 may comprise any type of bus architecture. Examples include a memory bus, a peripheral bus, a local bus, etc. The processing unit 1002 is an instruction execution machine, apparatus, or device and may comprise a microprocessor, a digital signal processor, a graphics processing unit, an application specific integrated circuit (ASIC), a field programmable gate array (FPGA), etc. The processing unit 1002 may be configured to execute program instructions stored in the memory 1004 and/or the storage 1006 and/or received via the data entry module 1008.

The memory 1004 may include read only memory (ROM) 1016 and random-access memory (RAM) 1018. The memory 1004 may be configured to store program instructions and data during operation of the hardware device 1000. In various embodiments, the memory 1004 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example.

The memory 1004 may also include nonvolatile memory technologies such as nonvolatile flash RAM (NVRAM) or ROM. In some embodiments, it is contemplated that the memory 1004 may include a combination of technologies such as the foregoing, as well as other technologies not specifically mentioned. When the subject matter is implemented in a computer system, a basic input/output system (BIOS) 1020, containing the basic routines that help to transfer information between elements within the computer system, such as during start-up, is stored in the ROM 1016.

The storage 1006 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD, or other optical media. The drives and their associated computer-readable media provide nonvolatile storage of computer readable instructions, data structures, program modules and other data for the hardware device 1000. It is noted that the methods described herein may be embodied in executable instructions stored in a computer readable medium for use by or in connection with an instruction execution machine, apparatus, or device, such as a computer-based or processor-containing machine, apparatus, or device.

It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for conducting the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high-definition DVD (HD-DVD™), a BLU-RAY disc; and the like.

A number of program modules may be stored on the storage 1006, the ROM 1016 or the RAM 1018, including an operating system 1022, one or more applications programs 1024, program data 1026, and other program modules 1028. A user may enter commands and information into the hardware device 1000 through the data entry module 1008. The data entry module 1008 may include mechanisms such as a keyboard, a touch screen, a pointing device, etc. Other external input devices (not shown) are connected to the hardware device 1000 via an external data entry interface 1030.

By way of example and not limitation, external input devices may include a microphone, joystick, game pad, satellite dish, scanner, or the like. In some embodiments, external input devices may include video or audio input devices such as a video camera, a still camera, etc. The data entry module 1008 may be configured to receive input from one or more users of the hardware device 1000 and to deliver such input to the processing unit 1002 and/or the memory 1004 via the bus 1014.

A display 1032 is also connected to the bus 1014 via the display adapter 1010. The display 1032 may be configured to display output of the hardware device 1000 to one or more users. In some embodiments, a given device such as a touch screen, for example, may function as both the data entry module 1008 and the display 1032. External display devices may also be connected to the bus 1014 via an external display interface 1034. Other peripheral output devices, not shown, such as speakers and printers, may be connected to the hardware device 1000.

The hardware device 1000 may operate in a networked environment using logical connections to one or more remote nodes (not shown) via the communication interface 1012. The remote node may be another computer, a server, a router, a peer device, or other common network node, and typically includes many or all the elements described above relative to the hardware device 1000. The communication interface 1012 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 1012 may include logic configured to support direct memory access (DMA) transfers between the memory 1004 and other devices.

In a networked environment, program modules depicted relative to the hardware device 1000, or portions thereof, may be stored in a remote storage device, such as, for example, on a server. It will be appreciated that other hardware and/or software to establish a communications link between the hardware device 1000 and other devices may be used.

The arrangement of the hardware device 1000 illustrated in FIG. 10 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 1000.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 10.

Other components may be implemented in software, hardware, or a combination of software and hardware. Moreover, some or all these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation to encompass all such modifications and similar arrangements.

What is claimed is:

1. A system for providing high availability for backup and restore applications in public clouds, comprising:
    one or more processors; and
    a non-transitory computer readable medium storing a plurality of instructions, which when executed, cause the one or more processors to:
        create a first virtual machine and a second virtual machine for at least one zone of a public cloud;
        create a disk in the public cloud;
        enable a selection to attach the disk as a shared disk to at least one of the first virtual machine or the second virtual machine;
        create object storage that stores backup data for the first virtual machine and the second virtual machine; and
        deploy the first virtual machine as an active node that executes a backup and restore application and the second virtual machine as a passive node that executes the backup and restore application when the active node fails to execute the backup and restore application.

2. The system of claim 1, wherein the at least one zone comprises one of a same availability zone for the active node and for the passive node or a first availability zone for the active node and a second availability zone for the passive node, wherein the first availability zone and the second availability zone are different availability zones in a same region.

3. The system of claim 1, wherein the disk comprises a solid-state disk which is at least one of in a same availability zone where the active node and the passive node are deployed, or in a same region where the active node and the passive node are deployed.

4. The system of claim 1, wherein the object storage comprises one of an object storage bucket or a hot blob storage account which is in the same region where the active node and the passive node are deployed and which stores data for at least one of the active node or the passive node.

5. The system of claim 1, wherein a floating internet protocol address is used to direct input data for an active node, which is failing to execute the backup and restore application, to a passive node which became a new active node, in response to the active node failing to execute the backup and restore application.

6. The system of claim 1, wherein the backup and restore application comprises deduplication software that optimizes data storage by de-duplicating data stored on the object storage.

7. The system of claim 1, wherein the plurality of instructions, when executed, will further cause the one or more processors to update an object with an updated value provided in a conditional write operation by one of the active node and the passive node during a failover, in response to a determination that the one of the active node or the passive node provided an object version number that matches the version number for the object identified in the conditional write operation.

8. A computer-implemented method for providing high availability for backup and restore applications in public clouds, comprising:
    creating a first virtual machine and a second virtual machine for at least one zone of a public cloud;
    creating a disk in the public cloud enabling a selection to attach the disk as a shared disk to at least one of the first virtual machine or the second virtual machine;
    creating object storage that stores backup data for the first virtual machine and the second virtual machine; and
    deploying the first virtual machine as an active node that executes a backup and restore application and the second virtual machine as a passive node that executes the backup and restore application when the active node fails to execute the backup and restore application.

9. The computer-implemented method of claim 8, wherein the at least one zone comprises one of a same availability zone for the active node and for the passive node or a first availability zone for the active node and a second availability zone for the passive node, wherein the first availability zone and the second availability zone are different availability zones in a same region.

10. The computer-implemented method of claim 8, wherein the disk comprises a solid-state disk which is at least one of in a same availability zone where the active node and the passive node are deployed, or in a same region where the active node and the passive node are deployed.

11. The computer-implemented method of claim 8, wherein the object storage comprises one of an object storage bucket or a hot blob storage account which is in a same region where the active node and the passive node are deployed and which stores data for at least one of the active node or the passive node.

12. The computer-implemented method of claim 8, wherein a floating internet protocol address is used to direct input data for an active node, which is failing to execute the backup and restore application, to a passive node which became a new active node, in response to the active node failing to execute the backup and restore application.

13. The computer-implemented method of claim 8, wherein the backup and restore application comprises deduplication software that optimizes data storage by de-duplicating data stored on the object storage.

14. The computer-implemented method of claim 8, wherein the computer-implemented method further comprises updating an object with an updated value provided in a conditional write operation by one of the active node or the passive node during a failover, in response to a determination that the one of the active node or the passive node provided an object version number that matches the version number for the object identified in the conditional write operation.

15. A computer program product, comprising a non-transitory computer-readable medium having a computer-readable program code embodied therein to be executed by one or more processors, the program code including instructions to:
- create a first virtual machine and a second virtual machine for at least one zone of a public cloud;
- create a disk in the public cloud;
- enable a selection to attach the disk as a shared disk to at least one of the first virtual machine or the second virtual machine;
- create object storage that stores backup data for the first virtual machine and the second virtual machine; and
- deploy the first virtual machine as an active node that executes a backup and restore application and the second virtual machine as a passive node that executes the backup and restore application when the active node fails to execute the backup and restore application.

16. The computer program product of claim 15, wherein the at least one zone comprises one of a same availability zone for the active node and for the passive node or a first availability zone for the active node and a second availability zone for the passive node, wherein the first availability zone and the second availability zone are different availability zones in a same region.

17. The computer program product of claim 15, wherein the disk comprises a solid-state disk which is at least one of in a same availability zone where the active node and the passive node are deployed, or in a same region where the active node and the passive node are deployed.

18. The computer program product of claim 15, wherein the object storage comprises one of an object storage bucket or a hot blob storage account which is in a same region where the active node and the passive node are deployed and which stores data for at least one of the active node or the passive node.

19. The computer program product of claim 15, wherein a floating internet protocol address is used to direct input data for an active node, which is failing to execute the backup and restore application, to a passive node which became a new active node, in response to the active node failing to execute the backup and restore application, wherein the backup and restore application comprises deduplication software that optimizes data storage by de-duplicating data stored on the object storage.

20. The computer program product of claim 15, wherein the program code includes further instructions to update an object with an updated value provided in a conditional write operation by one of the active node or the passive node during a failover, in response to a determination that the one of the active node or the passive node provided an object version number that matches the version number for the object identified in the conditional write operation.

* * * * *